April 20, 1954 R. J. HARKENRIDER 2,676,072
LUBRICATOR FOR DIESEL LOCOMOTIVE TRACTION
MOTOR SUSPENSION BEARINGS
Filed June 26, 1951 4 Sheets-Sheet 2

INVENTOR.
Robert J. Harkenrider
BY
Marmi, Brown and Hartmann
Attys.

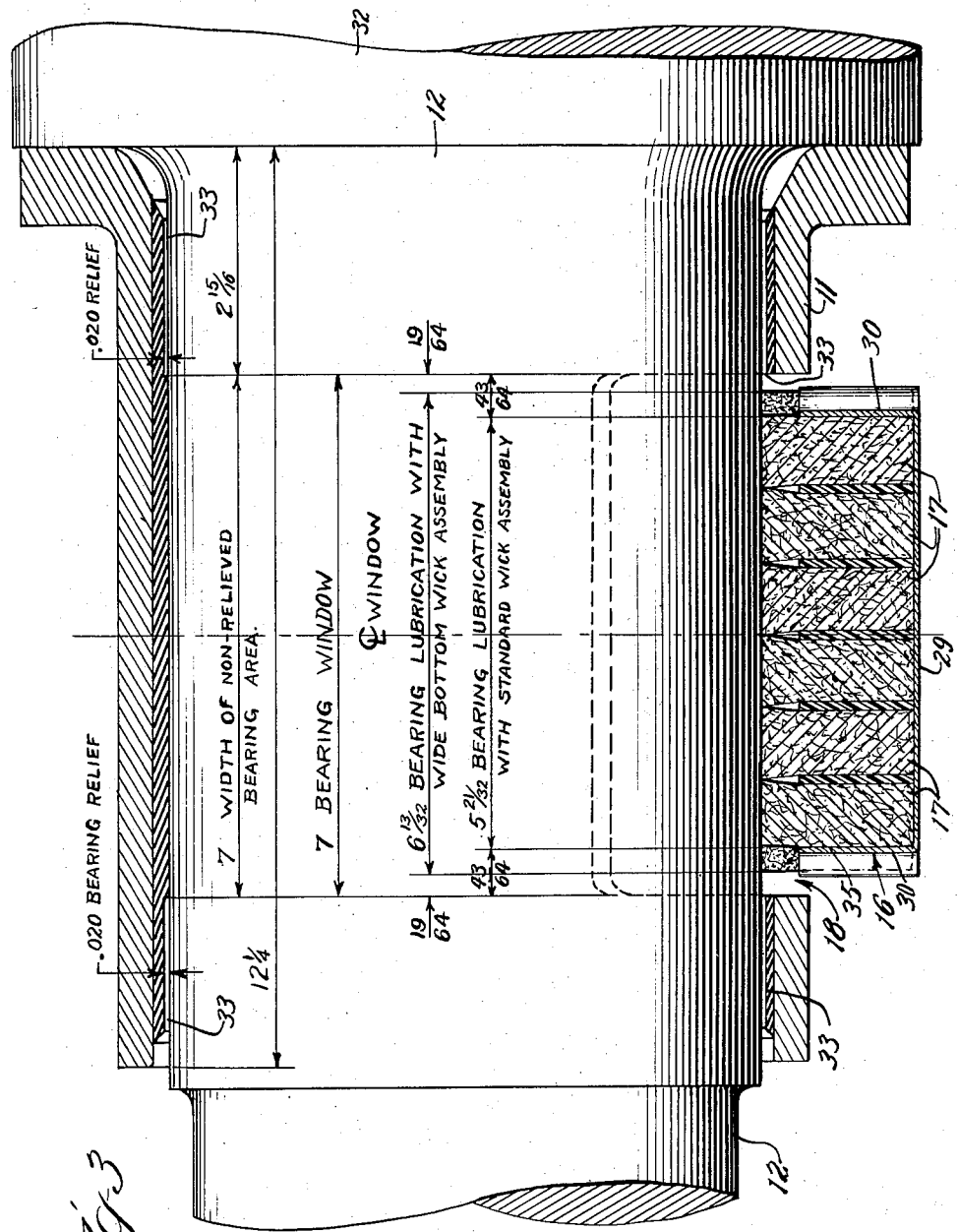

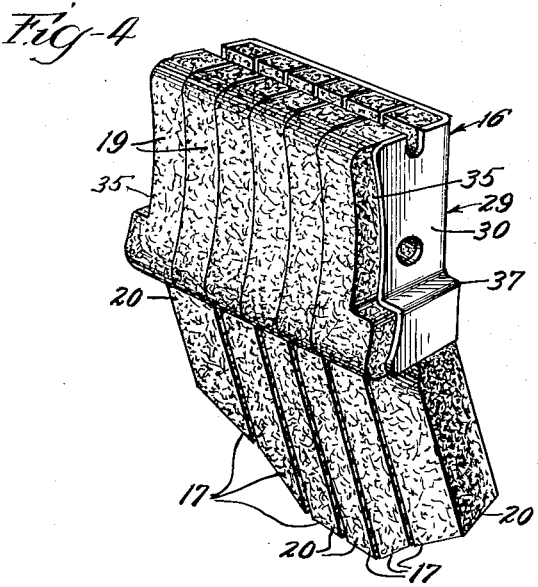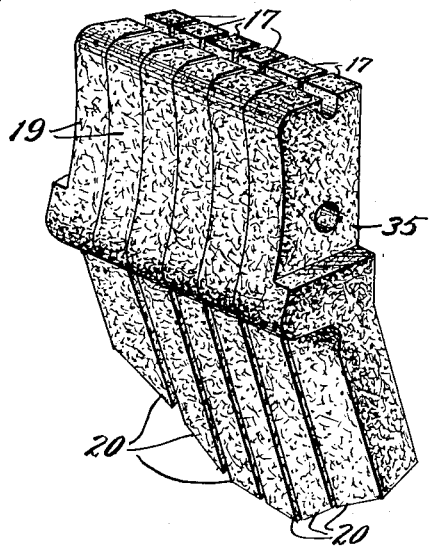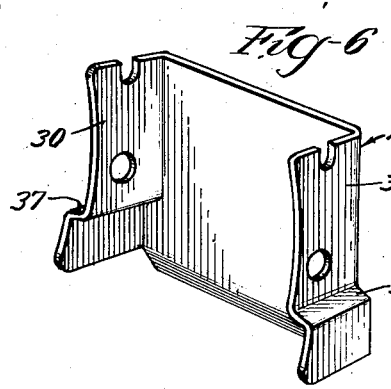

Patented Apr. 20, 1954

2,676,072

UNITED STATES PATENT OFFICE 2,676,072

LUBRICATOR FOR DIESEL LOCOMOTIVE TRACTION MOTOR SUSPENSION BEARINGS

Robert J. Harkenrider, Winona, Minn., assignor to Gladys D. Miller, Winona, Minn.

Application June 26, 1951, Serial No. 233,656

8 Claims. (Cl. 308—132)

My application Ser. No. 109,563, August 10, 1949, now Patent 2,640,742, dated June 2, 1953, discloses a lubricator for diesel locomotive traction motor suspension bearings including an applicator composed of a group of felts in the axle cap having rounded surfaces which are resiliently urged through a window opening in the bearing liner and pressed against the journal to apply the oil.

In order to leave clearance for proper operation of the appliance carrying the felts, in a large number of installations the overall width of the group was made substantially less than the window opening, with the result that sometimes there is insufficient oil supply adjacent to the extreme edge of the contact between the journal and the Babbitt liner.

The principal object of this invention is to provide the existing appliances with felt groups that will supply the necessary oil to the marginal area on the journal.

Generally speaking, this is accomplished by providing a group of felts narrow enough at one end portion to fit the existing appliance and wide enough at the other portions to extend the supply of oil laterally to the marginal area.

Further objects and advantages of the invention will appear as the disclosure proceeds and the description is read in connection with the accompanying drawings, in which Fig. 1 is a transverse vertical section through a motor suspension bearing and the axle to which it is applied;

Fig. 3 is a section axial to the bearing on the line 3—3 of Fig. 1;

Fig. 4 is a perspective view of a new applicator composed of a group of felt bodies and a holder;

Fig. 5 is a similar perspective view of the felt bodies; and

Fig. 6 is a similar perspective view of the felt holder shown separate from the bodies.

Figure 1:
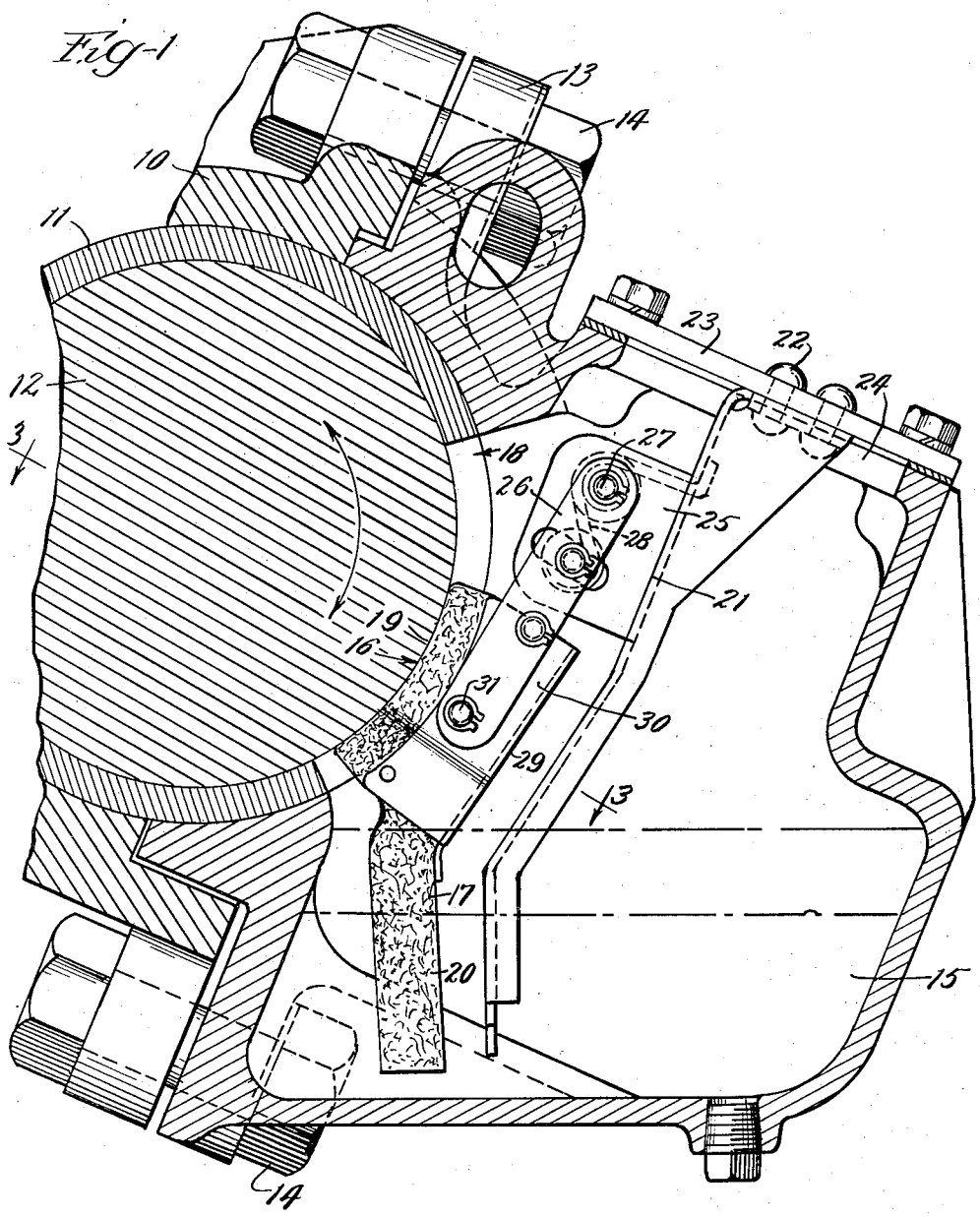
Figure 2:
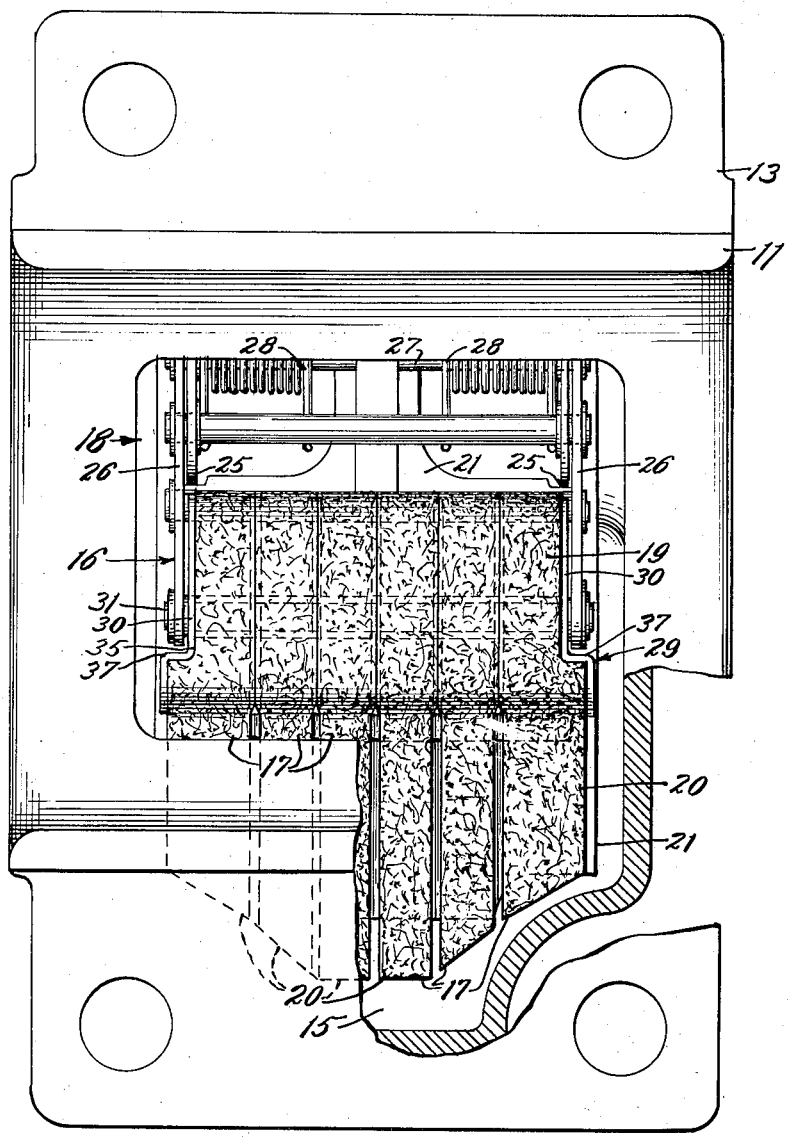
Fig. 2 is an elevation of the axle cap and lubricator looking from the left in Fig. 1 with the axle removed.

In Fig. 1, the reference numeral 10 indicates a familiar form of suspension bearing provided with a liner or shell 11 forming the actual bearing for the wheeled axle 12.

Associated with these is a motor suspension bearing cap 13 secured to the motor suspension bearing by bolts 14 and provided with an oil reservoir 15.

The lubrication is performed by an applicator, generally indicated by 16, composed of a group of felt bodies 17 resiliently urged through a window opening 18 in the liner 11 to press the curved surfaces 19 against the journal. Each of the bodies includes a depending wick portion 20 to raise oil from the reservoir 15 and deliver it to the surface 19.

The appliance for carrying the applicator is mounted upon a baffle plate 21 riveted at 22 to the cover 23 for the filling opening 24. The plate 21 is equipped with spaced flanges 25 to which links or levers 26 are pivoted by a shaft 27 and urged toward the window opening by springs 28.

The group of felts 17 is clasped by a holder 29 having side flanges 30 to confine the felts against excessive lateral spreading, but allowing them to project far enough to provide a proper applicator surface and allow for some side expansion at the extreme projection.

The applicator is mounted on the links or levers 26 by a shaft 31.

For further detail of the construction and operation, reference is made to the disclosure in the above mentioned application, which is made a part hereof in the interests of brevity.

The situation in the existing devices and the improvement is graphically represented in Fig. 3, which shows a portion of the axle 12 and the bearing liner 11 adjacent to the wheel 32, and the relief clearances in the liner are indicated at 33.

The width of the non-relieved bearing area is 7", which is also the width of the window opening 18 in the liner 11.

The existing applicators present bearing lubrication surfaces $5\frac{22}{32}$" plus some expansion due to brooming of the felt. That leaves a theoretical $^{43}\!/_{64}$" area at each side adjacent to the bearing relief limit that is likely to want full lubrication, and under some circumstances does not get enough.

The new applicators are $6\frac{12}{32}$" wide, plus an undetermined amount of brooming. That leaves a theoretical $^{19}\!/_{64}$" margin on the journal, which is not actually wiped by the lubricator, but due to brooming it is reduced a very considerable extent.

In actual practice, it has been found that this increase in the width of the applicator, indicated by a comparison of the holder marked "O" for "old" and that marked "N" for "new" furnishes satisfactory lubrication under all normal conditions without providing an excess to escape beyond the so-called oil dam and drip off on the bottom of the bearing.

This is accomplished by the construction shown in Figs. 4, 5, and 6, in which the applicator is made up of six felt bodies corresponding to those in the original installations, except that they are all thicker, making the effective width of the applicator wider.

In order to get the group within the appliances in the installations, the two outer felt bodies are cut away, as indicated at 35, and the sides 30 of the felt holder are offset at 37. This provides an applicator that will be received between the levers 26 or the existing appliances and operate as described in the mentioned application, while providing the extended lubricating surface shown best in Fig. 3.

The invention makes it possible to continue using more than 25,000 appliances while supplying the extra lubrication needed.

I claim:

1. In a journal lubricator, a lubricator pad having a concavely curved front surface for contact with a journal and offset laterally to extend the surface, a holder for the pad having side pieces to confine the pad laterally but spaced from the curved surface, and resilient means operatively connected to the pad for urging the pad toward the journal to be lubricated.

2. A lubricator pad having a concavely curved front surface for contact with a journal including a group of felt bodies side by side, the outer ones only of said group being offset laterally to extend the curved surface adjacent to one end portion only thereof, and a holder for the pad having side pieces to confine the pad laterally but spaced from the curved surface.

3. A lubricator pad having an upper lubricating portion and a depending wick portion, the lubricating portion having a concavely curved front lubricating surface and being extended laterally near the junction of the wick portion with the lubricating portion, in combination with a holder engaging the rear surface of the pad and having an offset side flange conforming to the lateral extension of the pad and having a front edge spaced rearwardly from the lubricating surface, whereby the pad is narrower in its upper portion to accommodate a mounting lever pivoted to the side flange of the holder.

4. A lubricator pad having an upper lubricating portion and a depending wick portion, the lubricating portion having a curved front lubricating surface, and the wick portion being wider than the lubricating portion near its junction therewith and lapping that portion to form a lateral extension to the lubricating surface thereof, in combination with a holder engaging the rear surface of the pad and having an offset side flange conforming to the lateral extension of the pad and having a front edge spaced rearwardly from the lubricating surface, whereby the pad is narrower in its upper portion to accommodate a mounting lever pivoted to the side flange of the holder.

5. A lubricator pad having a concavely curved front surface for contact with a journal to be lubricated and having at one side a substantially uni-planar surface and having its opposite side formed by two laterally offset surfaces whereby one end portion of the front surface is wider than the other end portion thereof, in combination with a holder engaging the rear surface of the pad and having an offset side flange conforming to the two laterally offset surfaces of the pad and having a front edge spaced rearwardly from the front surface of the pad, whereby the pad is narrower in its upper portion to accommodate a mounting lever pivoted to the side flange of the holder.

6. A lubricator pad having a concavely curved front surface for contact with a journal to be lubricated and having at one side a substantially uni-planar surface and having its opposite side formed by two laterally offset plane surfaces, the lower end portion of the front surface being wider than the upper end portion thereof, in combination with a holder engaging the rear surface of the pad and having an offset side flange conforming to the two laterally offset surfaces of the pad and having a front edge spaced rearwardly from the front surface of the pad, whereby the pad is narrower in its upper portion to accommodate a mounting lever pivoted to the side flange of the holder.

7. A unitary assembly of lubricator pads having a concavely curved front surface for contact with a journal to be lubricated comprising inner and outer pad elements, each inner element being defined by two substantially flat uni-planar surfaces and each outer element being defined by a single inner substantially flat uni-planar surface and a pair of laterally offset outer surfaces whereby one end portion of the front surface of the assembly is wider than the other end portion thereof.

8. The combination claimed in claim 7, in which the front surface of the lower portion of the assembly is wider than the front surface of the upper portion thereof.

References Cited in the file of this patent

UNITED STATES PATENTS

| Number | Name | Date |
|---|---|---|
| 300,029 | Stephenson | June 10, 1884 |
| 955,608 | Shortt | Apr. 19, 1910 |
| 2,260,520 | Hennessy | Oct. 28, 1941 |
| 2,540,829 | Miller | Feb. 6, 1951 |